United States Patent
Chu et al.

(10) Patent No.: US 9,712,985 B2
(45) Date of Patent: Jul. 18, 2017

(54) REPURPOSING A MOBILE DEVICE

(71) Applicant: NEXTBIT SYSTEMS INC., San Francisco, CA (US)

(72) Inventors: Brian Chu, San Mateo, CA (US); Alastair Antonio, San Francisco, CA (US); Michael A. Chan, San Francisco, CA (US)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 14/835,974

(22) Filed: Aug. 26, 2015

(65) Prior Publication Data

US 2017/0064524 A1 Mar. 2, 2017

(51) Int. Cl.
*H04W 24/02* (2009.01)
*H04W 68/00* (2009.01)
*H04W 4/16* (2009.01)

(52) U.S. Cl.
CPC ............ *H04W 4/16* (2013.01); *H04W 24/02* (2013.01); *H04W 68/005* (2013.01)

(58) Field of Classification Search
CPC ...... H04W 4/16; H04W 24/02; H04W 68/005
USPC ...................................... 455/414.1
See application file for complete search history.

(56) References Cited

U.S. PATENT DOCUMENTS

| 2002/0115423 | A1* | 8/2002 | Hatae | G08B 13/19645 455/404.1 |
|---|---|---|---|---|
| 2003/0220074 | A1* | 11/2003 | Wee | H04W 88/04 455/11.1 |
| 2004/0080618 | A1* | 4/2004 | Norris | G06K 9/00771 348/207.1 |
| 2008/0308747 | A1* | 12/2008 | Gordon | G01T 1/04 250/472.1 |
| 2009/0189981 | A1* | 7/2009 | Siann | H04N 7/183 348/143 |
| 2013/0029647 | A1* | 1/2013 | Nunally | G06Q 50/01 455/414.1 |
| 2013/0150006 | A1* | 6/2013 | Nunally | H04W 4/16 455/414.1 |
| 2013/0242091 | A1* | 9/2013 | Park | H04N 7/18 348/143 |
| 2013/0250729 | A1* | 9/2013 | Park | G01S 15/88 367/87 |
| 2014/0022385 | A1* | 1/2014 | Fischer | H04M 1/72538 348/143 |

(Continued)

*Primary Examiner* — Nathan Taylor
(74) *Attorney, Agent, or Firm* — Mattingly & Malur, PC

(57) ABSTRACT

Some examples include repurposing a mobile device for performing a plurality of nonconventional functions, including a fire detector, a radiation detector, and a Wi-Fi repeater. For example, the mobile device may be configured to serve as a fire detector by one or more modules that may use an onboard camera, microphone, and temperature sensor to monitor an area for fires. In addition, the mobile device may be configured to serve as a radiation detector. For instance, a camera image sensor and/or the memory on the device may be used to detect elevated levels of radiation in the vicinity of the mobile device. In response to detecting a fire and/or radioactivity, the mobile device may send an alert notification to another device. Further, the mobile device may be configured to concurrently serve as a Wi-Fi repeater, such as for extending a range of a wireless router, or the like.

18 Claims, 9 Drawing Sheets

(56) References Cited

U.S. PATENT DOCUMENTS

| | | | | |
|---|---|---|---|---|
| 2015/0030203 A1* | 1/2015 | Kim | ................... | G06K 9/00771 |
| | | | | 382/103 |
| 2015/0053864 A1* | 2/2015 | Klein | ..................... | G01T 1/026 |
| | | | | 250/370.08 |
| 2015/0332580 A1* | 11/2015 | Bokhary | .............. | G08B 25/016 |
| | | | | 340/539.13 |

* cited by examiner

REPURPOSING A MOBILE DEVICE

BACKGROUND

People use mobile electronic devices for communication, entertainment, work, navigation, accessing the Internet, and a variety of other functions. However, these mobile devices typically have limited lifespans, e.g., of one or two years, before being replaced with newer models. Consequently, a person may often have one or more retired mobile devices that are not currently being used for any productive purpose.

SUMMARY

Some implementations herein include techniques and arrangements for repurposing a mobile device for multiple other uses. For instance, the mobile device may serve several repurposed functions concurrently, such as for acting as a fire detector, a radiation detector, and/or a wireless repeater. One or more repurposing modules may be installed on the mobile device to utilize a plurality of sensors and other components already included on the mobile device. The one or more repurposing modules may reconfigure the mobile device for providing multiple repurposed functionalities to the mobile device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
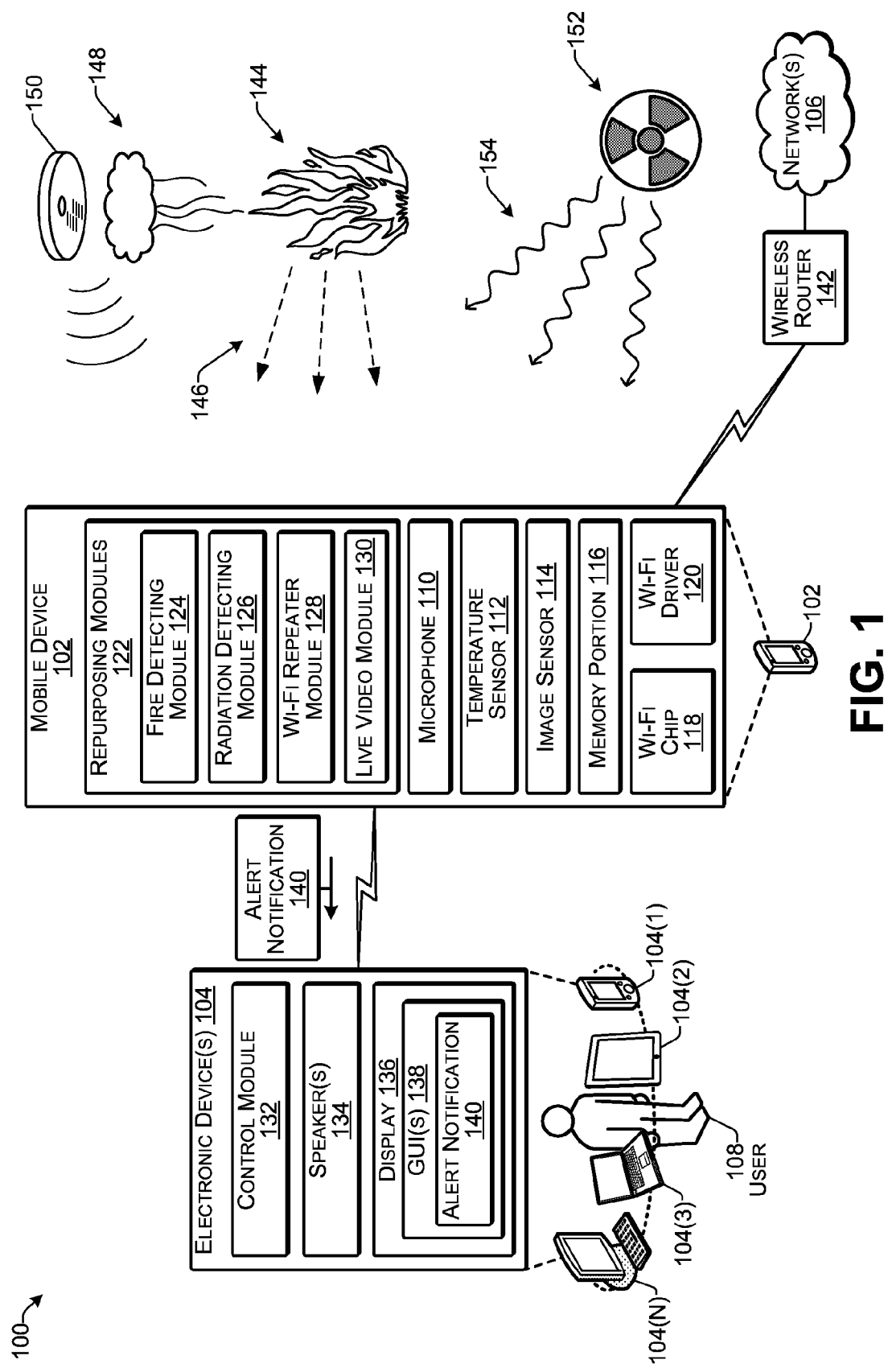
FIG. 1 illustrates an example system enabling repurposing of a mobile device according to some implementations.

Some examples herein include techniques and arrangements for repurposing a mobile device, such as a cellular phone or tablet computing device. For instance, the mobile device may be configured to serve multiple repurposed functions concurrently, such as for serving as a fire detector, a radiation detector, a wireless repeater, a remote live video source, and/or various other functions. As one example, at least one repurposing application or other type of repurposing module may be installed on the mobile device. The repurposing module may utilize a plurality of sensors and other components on the mobile device for enabling the repurposed functionality on the mobile device.

In some examples, the repurposing module may configure the mobile device to act as a fire detector for sensing a fire in proximity to the mobile device. For instance, the mobile device may be configured to use a camera of the mobile device as a flame detector. Furthermore, a temperature sensor included in the mobile device may be used to detect when an ambient temperature near the mobile device exceeds a threshold temperature. In addition, a microphone of the mobile device may be used for recognizing sounds in the vicinity of the mobile device, such as the sound of a smoke detector alarm, and/or the sounds typically made by a fire, such as sounds characteristic of conflagration, cracking and popping sounds, and the like. The mobile device may use various computational modeling and/or other analysis techniques on the data received from the camera, the temperature sensor, and the microphone for determining whether there is a fire in the vicinity of the mobile device.

In response to determining that there is a fire, the mobile device may send a communication to another electronic device, such as to provide a user with an alert notification regarding the fire. In some examples, in response to receiving an alert notification from the mobile device, the user may access a live video feed provided by the camera of the mobile device. For instance, the user may remotely access the camera of the mobile device for viewing a live video of the area within the field of view of the camera. Further, the live video may be accompanied by audio provided by the microphone of the mobile device.

In addition, the mobile device may concurrently serve as a radiation detector, such as for detecting the presence of radon gas or other radioactive materials in an area in which the mobile device is located. Several techniques may be used for detecting elevated radiation levels in the vicinity of the mobile device. As one example, the mobile device may track the number of bits in the memory of the mobile device that flip spontaneously, which may provide an indication of elevated local radiation levels. For example, elevated levels of radiation may cause an abnormal spike in the number of bits in memory that spontaneously flip from a "0" bit state to a "1" bit state, or vice versa. As another example, the image sensor of the mobile device may provide an indication of elevated radiation levels, such as based on changes in the pixels of the image sensor and depending on the type of image sensor present in the mobile device. In response to detecting an elevated level of radiation, e.g., greater than a threshold amount, the mobile device may send an alert notification to another device, such as one or more electronic devices of a user.

Furthermore, the mobile device may concurrently serve as a Wi-Fi range extender or other type of Wi-Fi repeater. For instance, the mobile device may be placed in an area of a dwelling or other structure where the user has difficulty receiving a wireless signal from a wireless router or the like. Thus, the mobile device may receive the Wi-Fi signal from the wireless router, and may repeat this signal to an area surrounding the mobile device. Similarly, the mobile device may receive a Wi-Fi signal from an electronic device of a user, and may repeat this signal to the wireless router. To serve as a repeater, the mobile device may be configured to appear to other Wi-Fi-enabled devices as a repeater or other wireless access point in a local wireless network. As one example, a driver of a Wi-Fi chip included in the mobile device may be configured to cause a Wi-Fi chip of the mobile device to act as a repeater for Wi-Fi signals detected within the range of the mobile device.

For discussion purposes, some example implementations are described in the environment of one or more modules on a mobile device to repurpose the mobile device for multiple nonconventional concurrent functions. However, implementations herein are not limited to the particular examples provided, and may be extended to other types of devices, other types of functions, and so forth, as will be apparent to those of skill in the art in light of the disclosure herein.

FIG. 1 illustrates an example system 100 for enabling repurposing of a mobile device 102 according to some implementations. For instance, the system 100 may enable the mobile device 102 to communicate with one or more other electronic devices 104, either directly, or over one or more networks 106. In the illustrated example, one or more electronic devices 104(1), 104(2), 104(3), . . . , 104(N) are associated with a user 108. For example, the first electronic device 104(1) may be a smart phone, the second electronic device 104(2) may be a tablet computing device, the third electronic device 104(3) may be a laptop computing device, and the Nth electronic device 104(N) may be a desktop computing device, although any of various other types of electronic devices may be used, as enumerated elsewhere herein. Further, while a single mobile device 102 is illustrated in this example, in other examples, there may be a plurality of the mobile devices 102, each having at least a portion of the repurposed functionality described herein.

The mobile device 102 may include a microphone 110, a temperature sensor 112, an image sensor 114, a memory 116, a Wi-Fi chip 118, and a Wi-Fi driver 120. For instance, mobile devices 102, such as smart phones and tablets, typically include all of these components as standard components. To provide new functionality to the mobile device 102, one or more repurposing modules 122 may be installed on the mobile device 102. For example, the repurposing modules 122 may include a fire detecting module 124, a radiation detecting module 126, a Wi-Fi repeater module 128, and a live video module 130.

The electronic device 104 may be able to receive communications from the mobile device 102. In some examples, the electronic device 104 may receive communications directly from the mobile device 102, such as when the electronic device 104 is within a communication range of the Wi-Fi chip 118 or other communication interface of the mobile device 102, as discussed additionally below. In other examples, the electronic device 104 may receive communications from the mobile device 102 over the one or more networks 106, such as in the case in which the electronic device 104 is remote from the mobile device 102 e.g., out of range of direct wireless communication with the mobile device 102.

In some cases, the electronic device 104 may include a control module 132 able to communicate with the mobile device 102 either directly, or over the one or more networks 106. For instance, the control module 132 may enable the user 108 to use the electronic device 104 to remotely control at least some features of the repurposing modules 122 on the mobile device 102. In addition, the electronic device 104 may include various other components, several of which are illustrated in this example, which may include at least one speaker 134 and a display 136. For example, the display 136 may be able to present one or more graphic user interfaces (GUIs) 138, such as for providing the user 108 with an alert notification 140 when such an alert notification is received from the mobile device 102. Thus, the control module 132 may present the alert notification 140 on the display 136 in the GUI 138. In addition, the speaker 134 on the electronic device 104 may be used to provide an audible indication of the alert notification 140. The user 108 may interact with the GUI 138 to respond to the alert notification 140.

In the illustrated example, the mobile device 102 may be in communication with the one or more networks 106, such as via a wireless router 142, or through other suitable networking techniques. The one or more networks 106 may include any suitable network, including a wide area network, such as the Internet; a local area network, such an intranet; a wireless network, such as a cellular network, a local wireless network, such as Wi-Fi and/or close-range wireless communications, such as BLUETOOTH®); a wired network; or any other such network, or any combination thereof. Accordingly, the one or more networks 106 may include both wired and/or wireless communication technologies. Components used for such communications can depend at least in part upon the type of network, the environment selected, or both. Protocols for communicating over such networks are well known and will not be discussed herein in detail. Accordingly, the mobile device 102 and the electronic device 104 may be able to communicate over the one or more networks 106 using wired or wireless connections, and combinations thereof. Alternatively, as mentioned above, the mobile device 102 may communicate directly with one or more of the electronic devices 104, e.g., when in communication range, such as via direct Wi-Fi communication, BLUETOOTH® communication, or any other suitable wired or wireless communication techniques.

In some examples, one or more of the repurposing modules 122 may be modules of an operating system (not shown in FIG. 1) on the mobile device 102. For instance, an open source operating system or other suitable operating system may be installed on the mobile device 102, which may be referred to as "jail breaking" or otherwise replacing an original operating system on the mobile device 102 with a different operating system. In some cases, the one or more repurposing modules may be included as native modules of the operating system.

Alternatively, the repurposing modules 122 may be modules that are separate from the operating system, such as may be included in one or more applications executable on the mobile device 102. For instance, the repurposing modules 122 may have permission for system-level access to the temperature sensor 112, which may be a temperature sensor on a processor, motherboard, or the like, such as typically included for monitoring processor temperature and/or the temperature of other components on the mobile device 102. In addition, while the repurposing modules 122 are illustrated in this example as residing on the mobile device 102, in other examples, at least some of the functionality of these modules may reside on another suitable computing device.

As one example, the repurposing modules 122 may enable the mobile device 102 to be used concurrently as a fire detector, a radiation detector, and a Wi-Fi repeater. For instance, suppose that a fire 144 starts in the area being monitored by the mobile device 102. The fire 144 may cause heat 146 and smoke 148, as well as being visible to the image sensor 114 in both the visible and infrared spectrum. Accordingly, the fire detecting module 124 may include fire detection logic for recognizing the presence of the fire 144 based on recognition analysis of one or more images received from the image sensor 114. Furthermore, the heat 146 from the fire 144 may cause the temperature sensor 112 to exceed a normal operation range of the temperature sensor 112, which may also provide the fire detecting module 124 with an indication of a fire in the vicinity. In addition, if there is a smoke detector 150 in the area, the smoke 148 from the fire may cause the smoke detector 150 to sound an alarm, which may be detected by the microphone 110 and recognized by the fire detecting module 124 as a smoke detector alarm sound. Alternatively, the microphone 110 may pick up other types of sounds caused by the fire. A recognition algorithm included in the fire detecting module 124 may be configured to correlate the captured sounds with sounds typically produced by a fire, such as based on a comparison of sound features extracted from the captured audio.

As one example, the fire detecting module 124 may combine the inputs from the image sensor 114, the temperature sensor 112, and the microphone 110 to determine whether there is a fire 144 in the vicinity of the mobile device 102. For instance, the fire detecting module 124 may determine that a threshold level of confidence exists that there is a fire within the vicinity of the mobile device 102. Based on this determination, the fire detecting module 124 may send the alert notification 140 to the electronic device 104 to provide the user 108 with notice that there is a fire in the area monitored by the mobile device 102. In some examples, in response to receiving the alert notification 140, the user 108 may be able to access a live video feed provided by the image sensor 114. For instance, the user 108 may use the control module 132 on the electronic device 104 to remotely interact with the live video module 130 of the mobile device 102 to cause the live video module 130 to send a live video and sound feed to the electronic device 104.

As another example, the radiation detecting module 126 may use the memory 116 and/or the image sensor 114 for detecting whether there are elevated levels of radioactive material present in the area monitored by the mobile device 102. For instance, a radioactive source 152 may emit radioactive particles 154 in the vicinity of the mobile device 102. As one example, radon gas may emit the radioactive particles 154, such as alpha particles. The radioactive particles 154 may impinge on the memory portion 116 and/or the image sensor 114. In the case of the memory portion 116, the radioactive particles 154 may cause transistors in the memory to flip e.g., change a charge level to such an extent that the transistor may flip from indicating a "0" bit to indicating a "1" bit, or vice versa. The radiation detecting module 126 may periodically scan the memory 116 for changed bits, and if a threshold number of bits have flipped since the last check, this may be an indication of an elevated radioactivity level in the vicinity of the mobile device 102.

As another example, the image sensor 114 may also exhibit a change in response to impingement by the radioactive particles 154. For instance, image sensors 114 used in mobile devices 102 may typically be CCD (charge-coupled device) sensors or CMOS (complementary metal oxide silicon) sensors. Both of these types of sensors are susceptible to damage from radioactive particles, and periodically scanning of the sensor 114 by the radiation detecting module 126 for inoperative, damaged, or otherwise changed pixels may indicate whether there is an elevated level of radiation in the vicinity of the mobile device 102. For instance, the radiation detecting module may determine a total number of changed pixels in comparison to a total number of pixels in the sensor and compare this number with a threshold. In response to determining that a threshold level of radioactivity is present in the vicinity of the mobile device 102, the radiation detecting module 126 may send an alert notification 140 to the electronic device 104.

Furthermore, along with the fire detection monitoring and the radiation detection monitoring, the mobile device 102 may also function concurrently as a Wi-Fi repeater, such as for extending the range of the wireless router 142. For instance, the Wi-Fi driver 120 on the mobile device 102 may be modified to enable the Wi-Fi chip 118 on the mobile device 102 to act as a repeater, such as for receiving and repeating communications received from the wireless router 142, and receiving and repeating communications received from the electronic device 104. Thus, when functioning as a wireless repeater under the IEEE 802.11 protocol, the Wi-Fi chip 118 may receive an existing signal from the wireless router 142 (or other wireless access point) and rebroadcast this signal to create a second network. For instance, when the distance between the electronic device 104 and the wireless router 142 is too great for a direct connection, the mobile device 102 may be used as a repeater for bridging the gap between the wireless router 142 and the electronic device 104.

Figure 2:
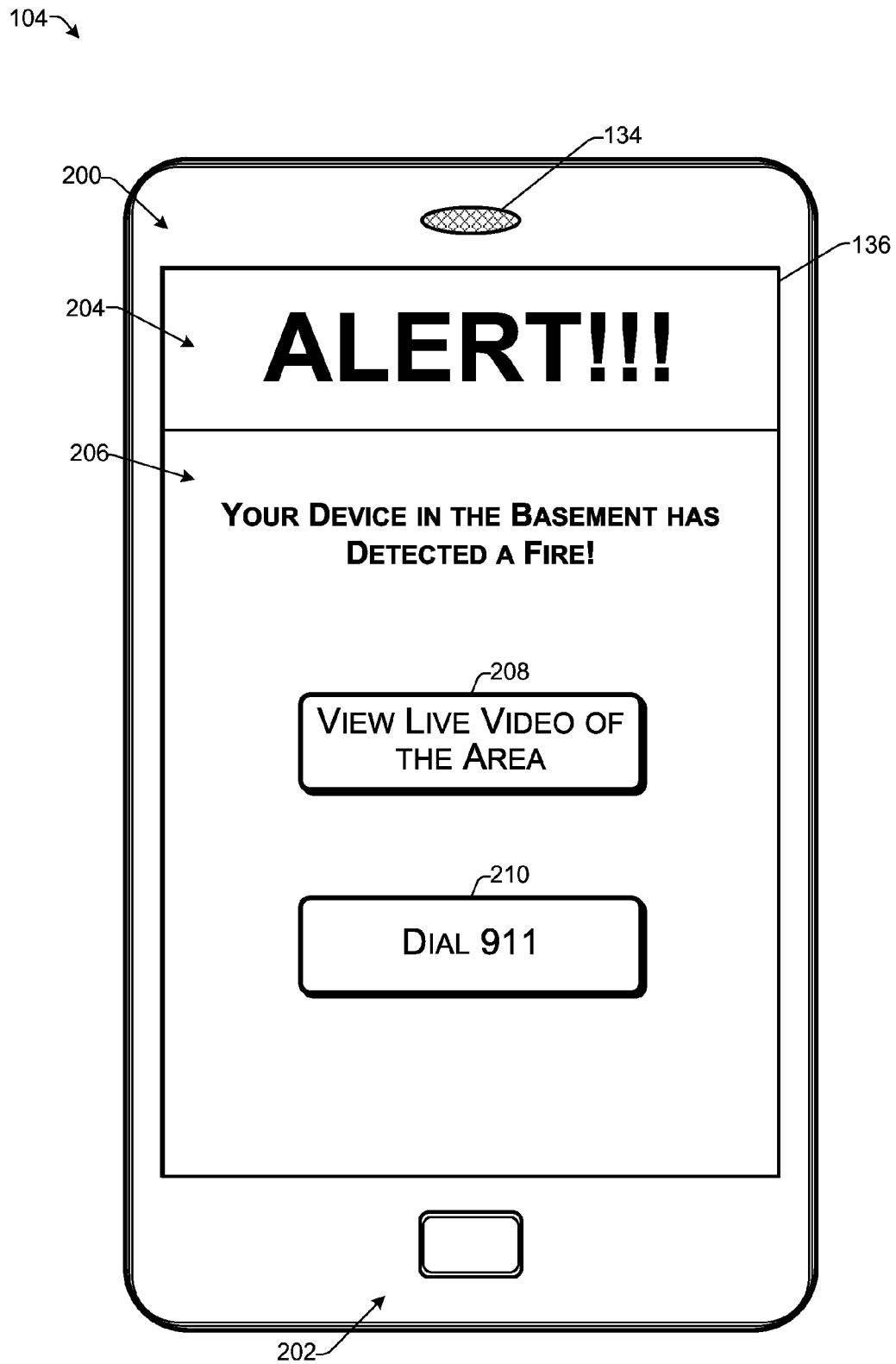
FIG. 2 illustrates an example GUI for providing an alert notification received from a mobile device according to some implementations.

FIG. 2 illustrates an enlarged example view of the electronic device 104 with an example GUI 200 presented on the display 136 according to some implementations. For instance, the GUI 200 may correspond to one or more of the GUIs 138 discussed above with respect to FIG. 1. In the example of FIG. 2, the electronic device 104 may include one or more electro-mechanical controls 202 and the at least one speaker 134, as well as various other components and features as discussed elsewhere herein.

As mentioned above with respect to FIG. 1, the electronic device 104 may receive an alert notification from the mobile device 102, such as in response to detection of a fire or elevated radioactivity levels. As one example, the control module 132 (not shown in FIG. 2) on the electronic device 104 may receive the alert notification and may present the GUI 200 to provide notification to the user and to enable the user to respond to the alert notification. In the example of FIG. 2, the GUI 200 includes an alert notification 204, and an indication of the type of the alert notification. For instance, as indicated at 206, the alert notification may notify the user that a fire has been detected in a monitored area, such as a basement in this example.

Further, the GUI 200 may include one or more virtual controls for enabling the user to take one or more actions in response to the alert notification. Thus, the user may tap on or otherwise select a virtual control 208 to view a live video feed of the monitored area. In response, the control module 132 may communicate with the live video module on the mobile device 102 to receive live video from the camera of the mobile device 102 and/or to receive live audio from the microphone of the mobile device 102. As another example, a virtual control 210 may be presented to enable the user to contact a fire department or other suitable authority for responding to the detected fire.

Accordingly, the user may be notified of the fire regardless of the location of the user and the electronic device 104, so long as the electronic device 104 is in communication with the one or more networks 106, such as the Internet, a cellular network, a LAN, or any other suitable network, as enumerated above. Further, while the control module 132 is described as receiving the alert notification in this example, in other examples, the alert notification may be received by any other type of electronic communication, such as email, instant messaging, SMS (short message service) text messaging, telephone call, and so forth.

Figure 3:
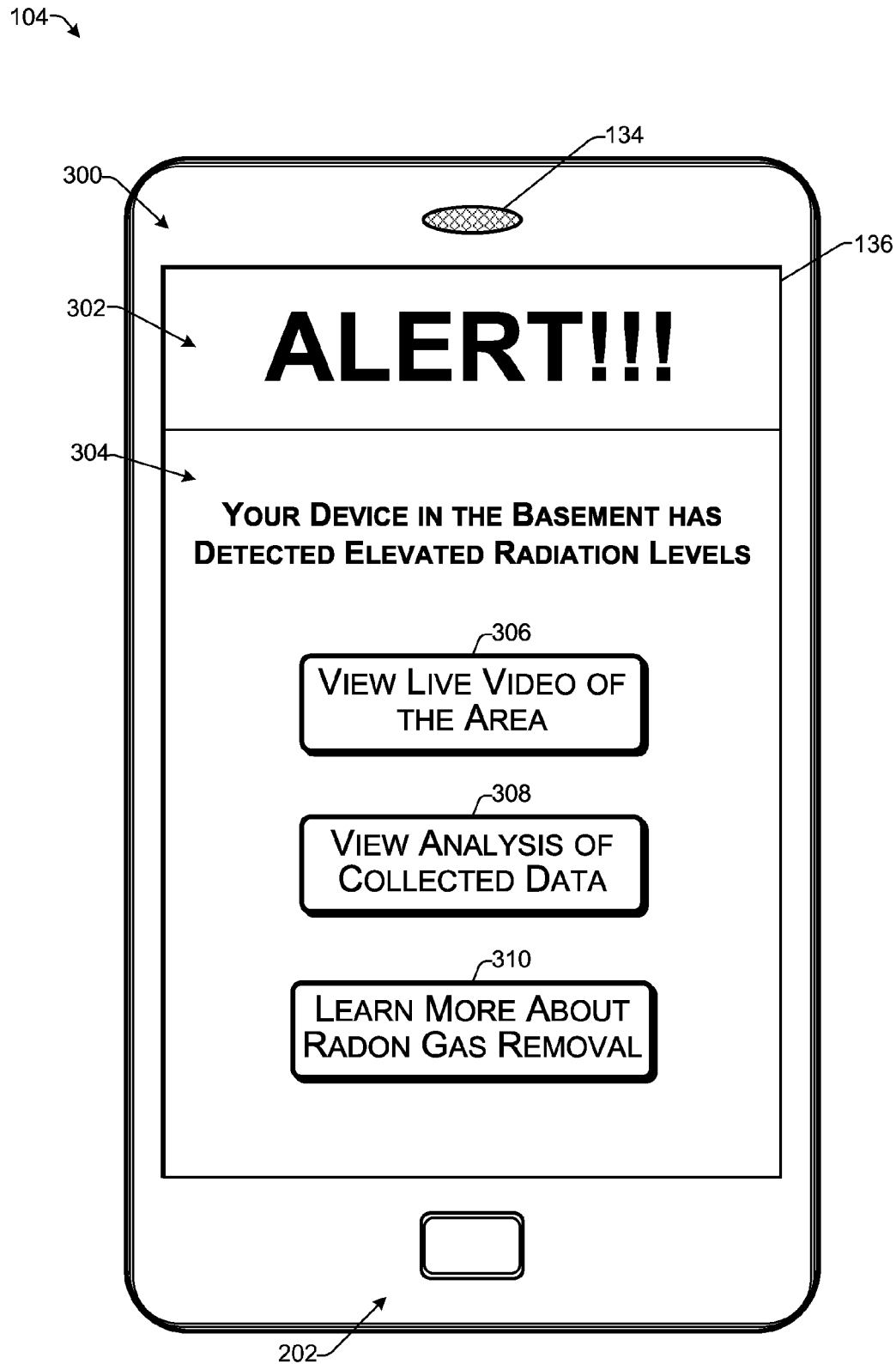
FIG. 3 illustrates an example GUI for providing an alert notification received from a mobile device according to some implementations.

FIG. 3 illustrates an enlarged example view of the electronic device 104 with an example GUI 300 presented on the display 136 according to some implementations. For instance, the GUI 300 may correspond to one or more of the GUIs 138 discussed above with respect to FIG. 1. In the example of FIG. 3, the electronic device 104 may receive an alert notification from the mobile device 102 in response to detection of elevated radioactivity levels. As one example, the control module 132 (not shown in FIG. 3) on the electronic device 104 may receive the alert notification and may present the GUI 300 to provide notice to the user and to enable the user to respond to the alert notification. In the example of FIG. 3, the GUI 300 includes an alert notification 302, and an indication of the type of the alert notification. For instance, as indicated at 304, the alert notification may notify the user that a radiation level above a threshold amount has been detected in a monitored area, such as a basement in this example.

Further, the GUI 200 may include one or more virtual controls for enabling the user to take one or more actions in response to the alert notification. Thus, the user may tap on or otherwise select a virtual control 306 to view a live video feed of the monitored area. In response, the control module 132 may communicate with the live video module on the mobile device 102 to receive live video from the camera of the mobile device 102 and/or to receive live audio from the microphone of the mobile device 102. As another example, a virtual control 308 may be presented to enable the user to view the data collected by the mobile device 102 that was used in making the determination of elevated radiation levels. For instance, the mobile device 102 may have detected a threshold number of memory flips and/or a threshold number of changed pixels in the image sensor. As another example, such as in the case that the radioactive material is radon gas, a virtual control 310 may be included to enable the user to access more information for eradicating radon gas from structures. Further, while radon gas is described as one example of a radioactive material that may be detected, those of skill in the art having the benefit of the disclosure herein will understand that numerous other types of radioactive materials may similarly be detected using the techniques herein.

The user may be notified of the elevated radiation level regardless of the location of the user and the electronic device 104, so long as the electronic device 104 is in communication with the one or more networks 106, such as the Internet, a cellular network, a LAN, or any other suitable network, as enumerated above. Further, while the control module 132 is described as receiving the alert notification in this example, in other examples, the alert notification may be received by any other type of electronic communication, such as email, instant messaging, SMS text messaging, telephone call, or the like.

Figure 4:
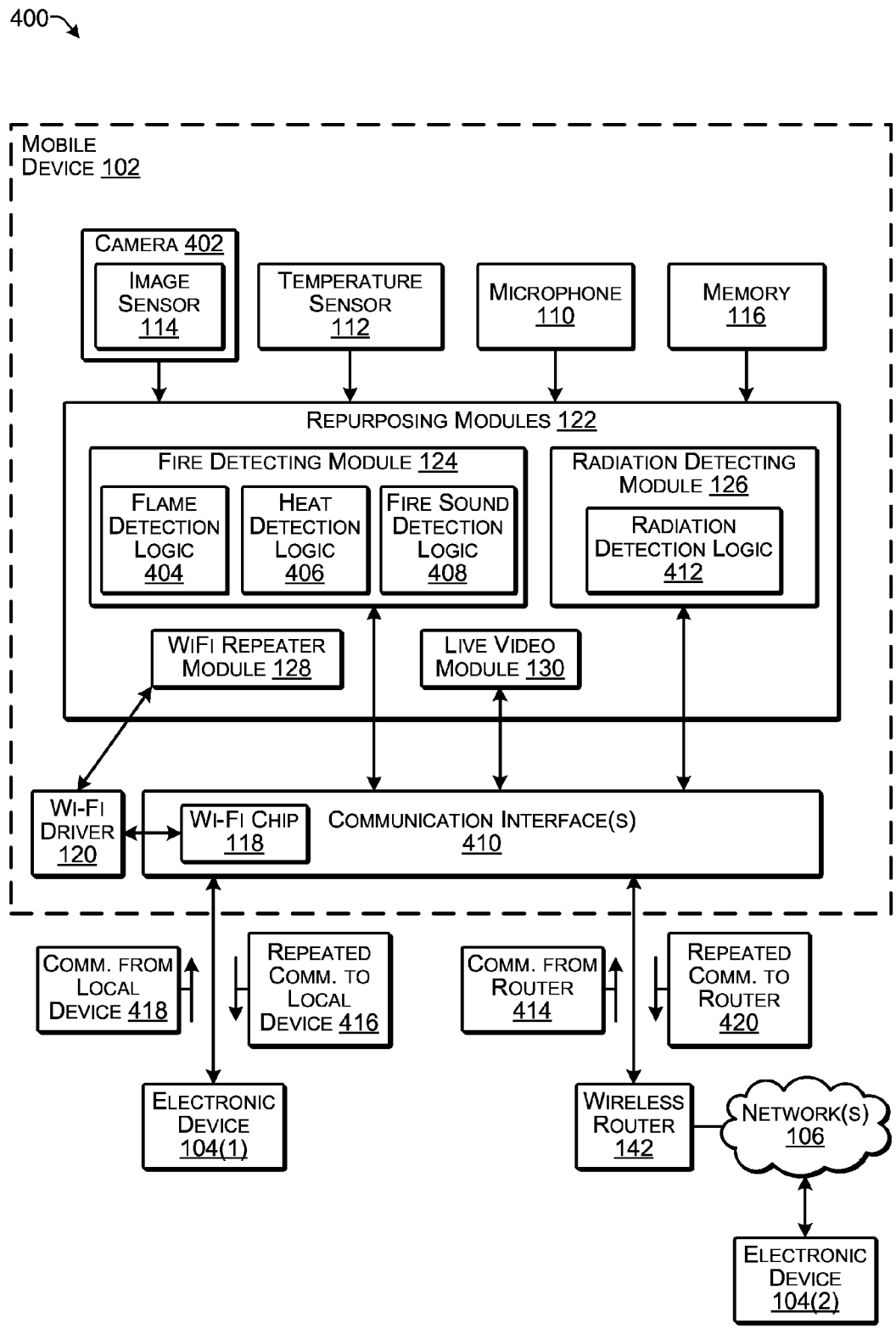
FIG. 4 is a block diagram illustrating repurposed functions performed by the mobile device according to some implementations.

FIG. 4 is a block diagram 400 illustrating an example of operations performed by the mobile device 102 when repurposed according to some implementations. In the example of FIG. 4, the repurposing modules 122 may receive one or more inputs to use for various purposes, such as fire detection and/or radiation detection. For instance, a camera 402 may include the image sensor 114. Both the fire detecting module 124 and the radiation detecting module 126 may periodically access the image sensor 114 for flame detection and/or radiation detection. Similarly, the fire detecting module 124 may periodically access the temperature sensor 112 for detecting an excessive increase in ambient heat and may periodically access the microphone 110 for detecting noises indicative of fire. Further, the radiation detecting module 126 may periodically access the memory portion 116 in addition to, or instead of the camera image sensor 114 for detecting radioactive material.

The fire detecting module 124 may include flame detection logic 404, heat detection logic 406, and fire sound detection logic 408. For instance, the flame detection logic 404 may include one or more computational models, statistical models, recognition software, computer vision components, or the like, that are trained or otherwise configured to recognize flames from images captured by the camera 402. As one example, the flame detection logic 404 may be a statistical model that is initially trained using a set of training data. For instance, the training data may include photographs or video of a large number of fires. The trained model may then be used for identifying flames imaged by the image sensor 114 of the camera 402. One or more similarly trained models may be used as part of the fire sound detection logic 408 for determining whether sounds detected by the microphone correspond to a fire. Examples of suitable statistical models that may be incorporated into the flame detection logic 404 and/or the fire sound detection logic 408 may include regression models, such as linear regression models, and stochastic models, such as Markov models, hidden Markov models, and so forth. Additionally, or alternatively, various other algorithms, priority rules, rule sets, computational models, and the like, may be used as the flame detection logic 404 and/or the fire sound detection logic 408 for determining whether there is a fire.

In some examples, the heat detection logic 406 may also include a statistical model or other type of computational model. However, as the heat detection includes substantially fewer variables than the fire sound detection or the flame detection, simpler logic may be used. For instance, the normal working range of the temperature sensor 112 may be determined empirically. When the temperature exceeds the normal working range by a threshold amount, e.g., 20%, 40%, etc., this information may be correlated with data collected from the camera 402 and the microphone 110 for determining whether there are other indications of a fire prior to sending an alert notification. In other examples, an alert notification may be sent when the temperature exceeds the threshold regardless of whether the flame detection logic 404 or the fire sound detection logic 408 also indicates a fire, as this may provide an indication to the user of a malfunction of the mobile device 102 even if there is not a fire.

In some types of mobile devices 102, the temperature sensor 112 is included so that the mobile device shuts down to avoid damage if a temperature higher than a predetermined threshold is detected. Thus, in some cases, the operating system of the mobile device 102 may be modified to allow the mobile device 102 to continue to operate at slightly higher temperatures to serve as a fire detector and/or the operating system may be configured to prevent operation of the processor at overclocked processing speeds to ensure that higher temperatures caused the processor operations are unlikely.

Based on the outputs of the flame detection logic 404, the heat detection logic 406 and/or the fire sound detection logic 408, the fire detecting module 124 may determine whether to send an alert notification. For instance, the fire detecting module 124 may include various other algorithms, priority rules, rule sets, computational models, and the like, that may be used by the fire detecting module 124 to take into account the information from the flame detection logic 404, the heat detection logic 406, and/or the fire sound detection logic 408 for making a decision as to whether there is a fire. As one example, if the fire detecting module 124 determines within a threshold level of confidence that there is a fire, the fire detecting module 124 may use one or more communication interfaces 410 to send an alert notification to another electronic device 104(1) and/or 104(2) of the user.

In addition, the radiation detecting module 126 may include radiation detection logic 412. For instance, the radiation detection logic may obtain data from the memory 116 and/or the camera image sensor 114 for determining whether there is radioactive material near the mobile device 102. As one example, the mobile device 102 may be used for detecting radon gas in a home or other structure. Radon gas is a radioactive gas that may be released from the normal decay of the elements uranium, thorium, and radium, which occur naturally in the ground throughout the world. Radon is an invisible, odorless gas that seeps up through the ground and diffuses into the air. Radon may also dissolve into ground water and be released into the atmosphere when the water is exposed to the air. Radon gas usually exists at very low levels outdoors. However, in locations with little ventilation, such as underground mines, basements, and the like, radon can accumulate to levels that substantially increase the risk of lung cancer. For instance, radon from soil can enter homes through cracks in walls or foundations, may be released from building materials, and/or may be released from water that contains radon. Radon levels may be higher in homes that are well insulated, tightly sealed, and/or built on ground rich in the elements uranium, thorium, and radium. Because radon gas is heavier than air, the radon gas can accumulate in low-lying areas, such as the ground floors or basements of houses and other buildings, thereby presenting risk of lung cancer to people occupying these spaces.

When a radon gas atom decays, it emits an alpha particle to become polonium-218. Contact of alpha particles with memory transistors can cause flipping of the memory transistors from one state to another, e.g., changing a bit from "0" to "1" or vice versa. In some examples, the radiation detection module 126 may reserve a substantial memory portion 116 of the mobile device 102 from being used for other purposes, and may periodically check or otherwise scan the reserved portion of memory for flipped bits, i.e., bits that read differently from the last time the reserved memory portion 116 was read. The number of flipped bits may provide an indication of the presence of any radiation in the vicinity of the mobile device 102. For instance, if a threshold number of bits are determined to have flipped since the last time the memory was checked, then the radiation detection module may issue an alert notification. Accordingly, the radiation detection logic 412 may perform the periodic checking of the reserved memory portion, may count the number of flipped bits, if any, and may determine whether a number of flipped bits (e.g., a percentage) exceeds a threshold amount that is sufficiently high to indicated the presence of radioactive material above a safe level.

As another example, the radiation detection logic 412 may periodically access the image sensor 114 of the camera 402. The radiation detection logic 412 may scan the image sensor 114, for determining whether there has been a change in the pixels of the image sensor 114, e.g., whether any of the pixels are no longer operable, damaged, or the like, as compared with a previous scan of the image sensor 114. If more than a threshold number of pixels have failed, become inoperable, or have had a substantial change in sensitivity, the radiation detection logic 412 may determine to send an alert notification to the user via the one or more communication interfaces 410.

In addition, the Wi-Fi repeater module 128 may be installed along with a modified Wi-Fi driver 120 to enable the mobile device 102 to function as a range extender or otherwise perform as a repeater. For instance, the Wi-Fi driver 120 may reconfigure the Wi-Fi chip 118 to perform a repeating function. Thus, the Wi-Fi repeater module 128 may be activated by a user when the user desires to use the mobile device 102 as a repeater. The Wi-Fi chip 118 may receive a communication 414 from the wireless router 142, and may repeat the communication 414 for sending a repeated communication 416 to, e.g., a first electronic device 104(1) associated with a user. Similarly, the Wi-Fi chip 118 may receive a communication 418 from the first electronic device 104(1), and may repeat the communication 418 for sending a repeated communication 420 to the wireless router 142. Accordingly, the mobile device 102 extends the range of the wireless router 142 by an additional distance. In some examples, the mobile device 102 may be configured to function as the repeater while also concurrently monitoring an area around the mobile device 102 for fire and/or radioactive material as discussed above.

Further, in some cases, one or more of the electronic devices 104, such as the electronic device 104(2), may be out of range of direct communication with the mobile device 102. In such a case, the mobile device 102 may communicate with the electronic device 104(2) over the one or more networks 106, such as for receiving an alert notification, live video and/or live sound from the mobile device 102.

Figure 5:
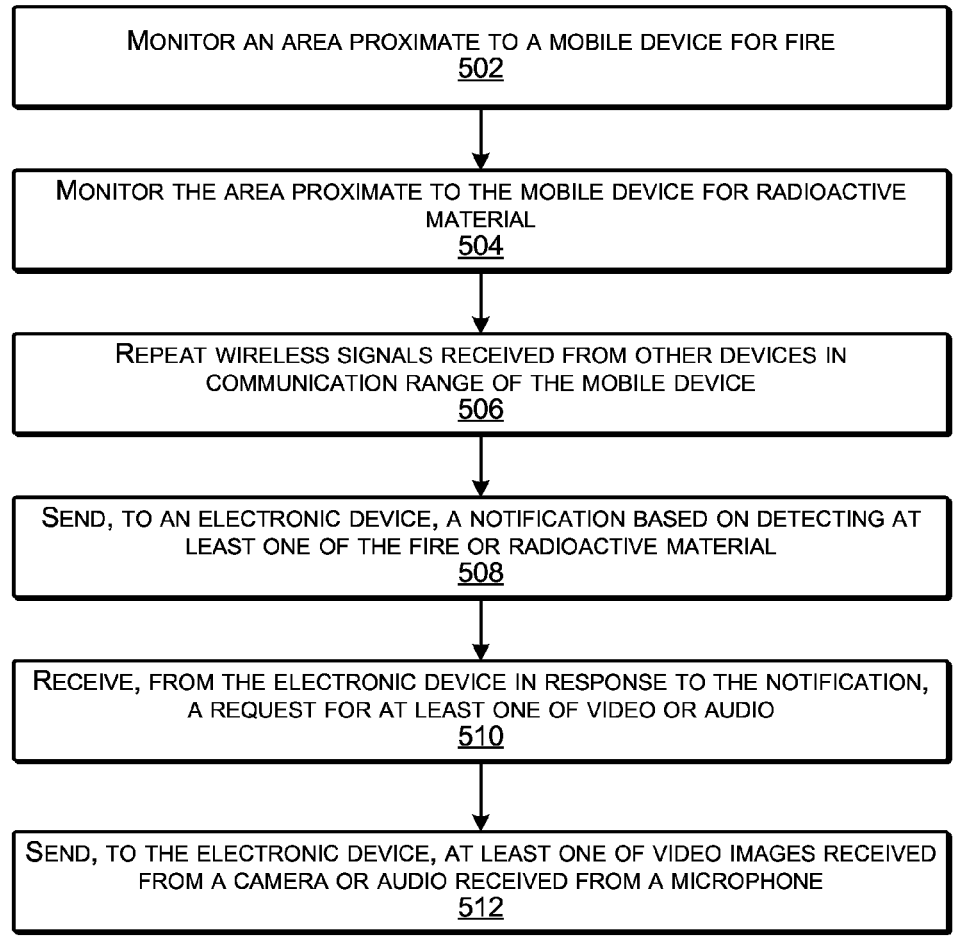
FIG. 5 is a flow diagram illustrating an example process according to some implementations.
Figure 6:
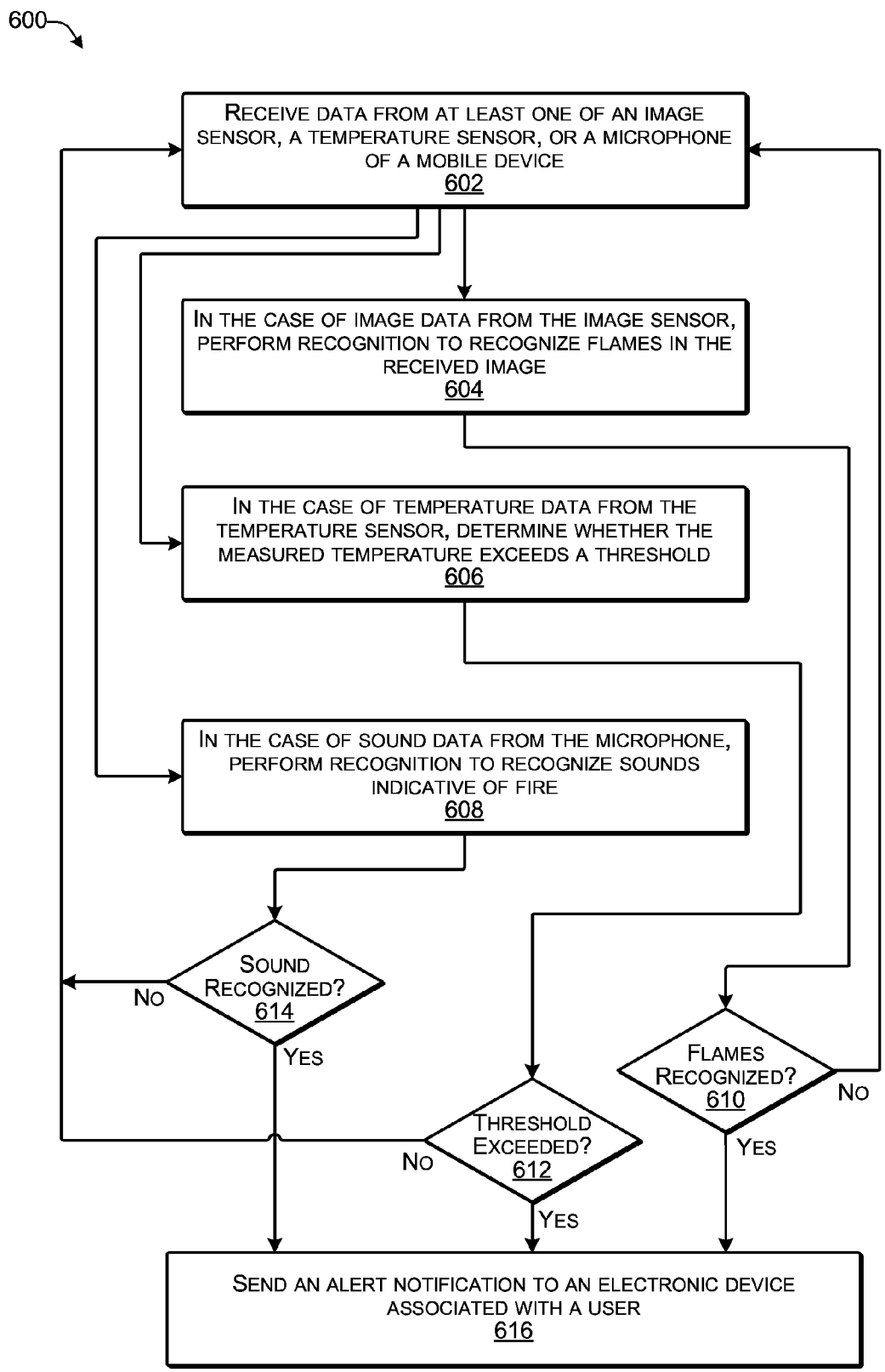
FIG. 6 is a flow diagram illustrating an example process according to some implementations.
Figure 7:
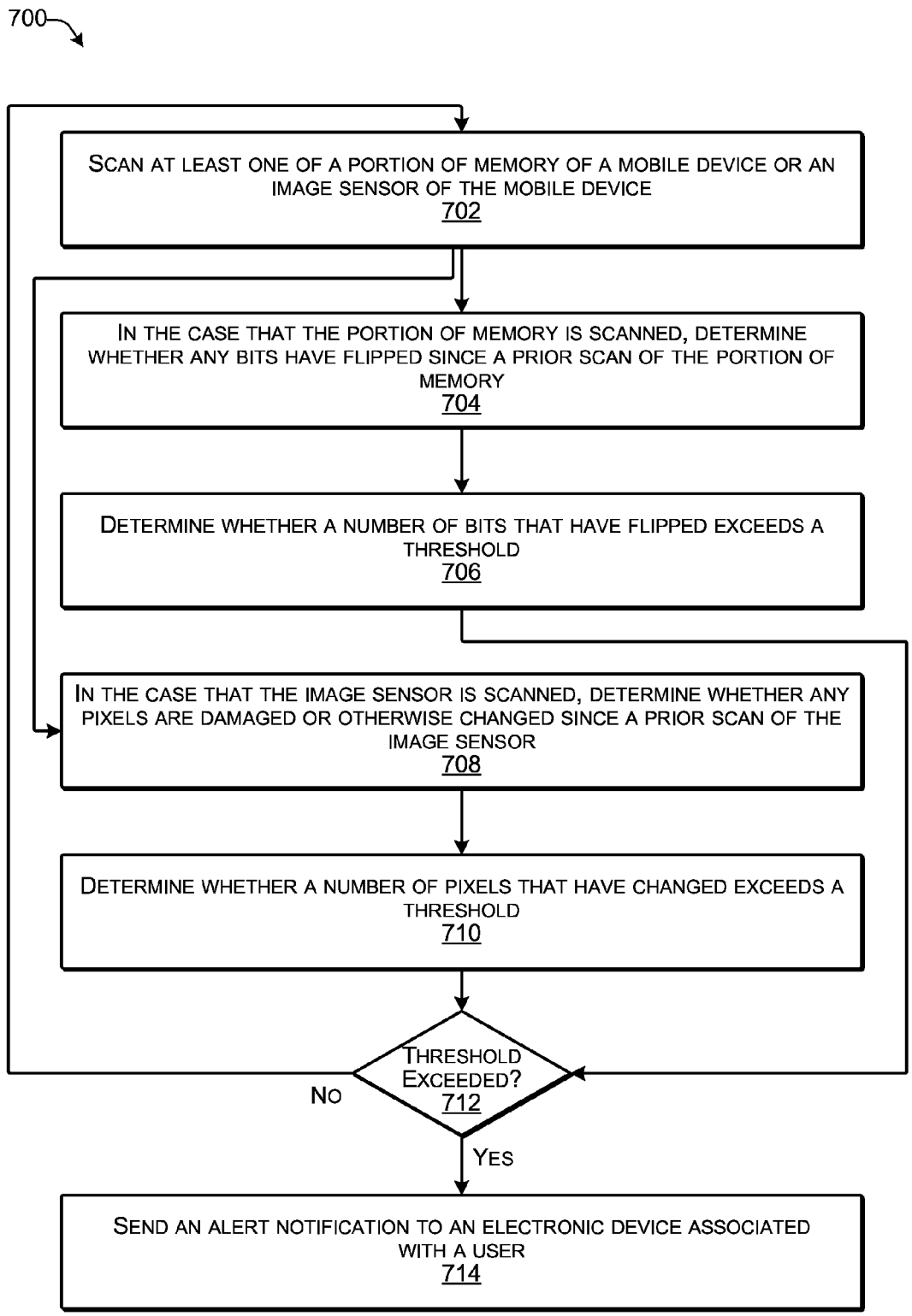
FIG. 7 is a flow diagram illustrating an example process according to some implementations.

FIGS. 5-7 are flow diagrams illustrating example processes according to some implementations. The processes are illustrated as collections of blocks in logical flow diagrams, which represent a sequence of operations, some or all of which can be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. For discussion purposes, the processes are described with reference to the environments, architectures and systems described in the examples herein, although the processes may be implemented in a wide variety of other environments, architectures and systems.

FIG. 5 is a flow diagram illustrating an example process 500 according to some implementations that may be executed by the mobile device 102 for repurposing the mobile device 102.

At 502, the mobile device may monitor an area proximate to the mobile device for fire. For instance, the mobile device may use the camera, microphone, and/or the temperature sensor of the mobile device for detecting a fire in proximity to the mobile device as discussed additionally, e.g., with respect to FIG. 6.

At 504, the mobile device may monitor the area proximate to the mobile device for radioactive material. For example, the mobile device may use the image sensor and/or a reserved portion of the memory of the mobile device for detecting radioactive material in proximity to the mobile device, as discussed additionally, e.g., with respect to FIG. 7.

At 506, the mobile device may repeat wireless signals received from other devices in communication range of the mobile device. For instance, the Wi-Fi driver of the mobile device may be configured to cause the Wi-Fi chip of the mobile device to function as a repeater, as discussed additionally, e.g., with respect to FIG. 4.

At 508, the mobile device may send, to an electronic device, a notification based on detecting at least one of a fire or radioactive material. For instance, in response to detection of a fire or radioactive material, the mobile device may send an alert notification to at least one electronic device associated with a user, such as a user who also configured the mobile device to monitor for fire and radioactive material. In some cases, the mobile device may use an application programming interface (API) to communicate with a control module on the electronic device. In other examples, the mobile device may send the notification using any of various other electronic communication techniques, such as email, SMS text message, instant message, phone call, or the like.

At 510, the mobile device may receive, from the electronic device, in response to the notification, a request for at least one of video or audio. For instance, in response to receiving the alert notification, the user of the electronic device may send a request to the mobile device for the mobile device to provide video and/or audio of the area that the mobile device is currently monitoring.

At 512, the mobile device may send, to the electronic device, at least one of video images received from a camera or audio received from a microphone. In response in to receiving the request from the electronic device, the mobile device may send a live video feed and/or audio feed of the monitored area.

FIG. 6 is a flow diagram illustrating an example process 600 according to some implementations that may be executed by the mobile device 102 for monitoring an area for fire.

At 602, the mobile device may receive data from at least one of an image sensor, a temperature sensor, or a microphone of the mobile device. For instance, the mobile device may periodically receive images from the image sensor and may perform a flame recognition function on the received images to determine whether there is a fire in the field of view of the camera of the mobile device. Furthermore, the mobile device may periodically check the temperature indicated by a temperature sensor on the mobile device to determine whether the temperature has exceeded a threshold. In addition, the mobile device may periodically receive audio from the microphone of the mobile device, and may perform a sound recognition function on the received audio to determine whether the received audio corresponds to a sound indicative of a fire in the proximity of the mobile device. In some examples, if there is also a smoke detector in the monitored area, the mobile device may recognize an alarm sound of the smoke detector as an indication of a fire in the monitored area. As another example, the mobile device may perform sound recognition to detect other sounds indicative of a fire in the monitored area such as conflagration sounds, popping, crackling, or the like.

At 604, in the case that image data is received from of the image sensor, the mobile device may perform recognition to recognize flames in the received image. For instance, the mobile device may employ a statistical model or other computational model to perform flame recognition. As one example, the computational model may extract one or more features from an image obtained from the image sensor and may compare these features with features of flames previously compiled as part of the model. Based on a level of confidence or other determination technique, the computational model may determine whether there is a flame included in the image obtained from the image sensor.

At 606, in the case that temperature data is received from the temperature sensor, the mobile device may determine whether the measured temperature exceeds a threshold. For instance, the heat detection logic may include a threshold temperature above which there may be a presumption that a fire is in proximity to the mobile device. For instance, the threshold may be sufficiently above the normal operating temperature of the processor or other component with which the temperature sensor is associated so as to avoid false alarms caused by normal operation of the mobile device.

At 608, in the case that sound data is received from the microphone, the mobile device may perform sound recognition to recognize sounds indicative of fire. For instance, the mobile device may employ a statistical model or other type of computational model for performing the sound recognition. As one example, the computational model may extract one or more features from the sound collected from the microphone. The computational model may compare the extracted features with features of known to indicate a fire, such as may be associated with a smoke detector alarm or other sounds indicative of a fire, as discussed above.

At 610, if flames are recognized, the process goes to block 616. Otherwise, if flames are not recognized, the process may continue monitoring new images captured by the image sensor on a periodic basis.

At 612, if a threshold temperature is exceeded, the process goes to block 616. Otherwise, if the threshold temperature is not exceeded, the process may continue to periodically receive temperature data from the temperature sensor.

At 614, if a sound indicative of fire is recognized, the process goes to block 616. Otherwise, if a sound indicative of fire is not recognized, the process may continue to periodically receive sound data through the microphone.

At 616, if the result of at least one of blocks 610-614 is "Yes", the mobile device may send an alert notification to an electronic device of a user. For instance, the user of the electronic device may also be a user associated with the mobile device.

FIG. 7 is a flow diagram illustrating an example process 700 according to some implementations that may be executed by the mobile device 102 for monitoring an area for radioactive material.

At 702, a mobile device may scan at least one of a portion of memory of the mobile device or an image sensor of the mobile device. For instance, the portion of memory may be reserved for use as a radioactivity sensor, which may be scanned periodically to detect radioactivity. Additionally, or alternatively, the mobile device may periodically scan the image sensor of the camera to detect changes caused to the pixels of the sensor by radioactive particles.

At 704, in the case that the portion of memory is scanned, the mobile device may determine whether any bits in the memory portion have flipped since a prior scan of the memory portion. For instance, the radiation detection logic may count the number of bits that have flipped out of the total number of bits in the reserved portion of memory.

At 706, the mobile device may determine whether a number of bits that have flipped exceeds a first threshold. For instance, the radiation detection logic may determine whether a percentage of bits that have flipped exceeds a threshold percentage, or may employ any of various other comparison techniques for determining whether a threshold amount of bits have flipped since a previous scan of the memory portion.

At 708, in the case that the camera image sensor is scanned, the mobile device may determine whether any pixels are damaged or otherwise changed since a prior scan of the image sensor. For instance, as discussed above, radioactive particles may damage or otherwise alter the function of the pixels in the image sensor. Accordingly, the radiation detection logic may compare new pixel scan information obtained from the image sensor with baseline pixel scan information previously obtained from the image sensor for determining any changes to the pixels of the image sensor.

At 710, the mobile device may determine whether a number of pixels that have changed exceeds a second threshold. For instance, the radiation detection logic may determine whether a percentage of pixels that have changed exceeds a threshold percentage, or may employ any of various other comparison techniques for determining whether a threshold amount of pixels have changed since a previous scan of the image sensor.

At 712, if either the first threshold for the number of flipped bits or the second threshold for the number of changed pixels is exceeded, the process goes to block 714. Otherwise, if neither of the thresholds is exceeded, the process returns to block 702 to continue monitoring the area for radioactive material.

At block 714, the mobile device may send an alert notification to an electronic device associated with a user. For instance, the user of the electronic device may also be a user associated with the mobile device.

The example processes described herein are only examples of processes provided for discussion purposes. Numerous other variations will be apparent to those of skill in the art in light of the disclosure herein. Further, while the disclosure herein sets forth several examples of suitable frameworks, architectures and environments for executing the processes, implementations herein are not limited to the particular examples shown and discussed. Furthermore, this disclosure provides various example implementations, as described and as illustrated in the drawings. However, this disclosure is not limited to the implementations described and illustrated herein, but can extend to other implementations, as would be known or as would become known to those skilled in the art.

Figure 8:
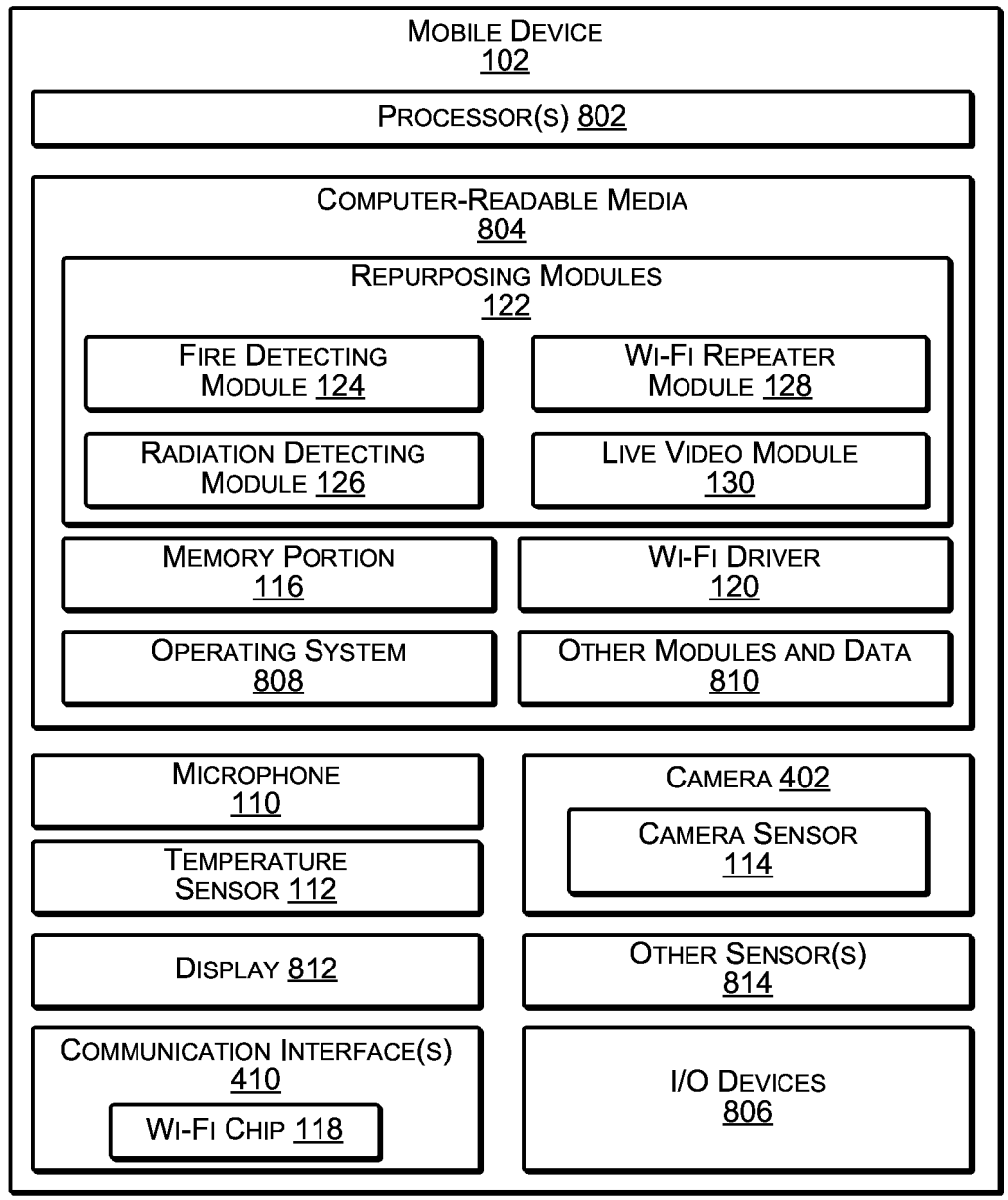
FIG. 8 illustrates select components of an example mobile device according to some implementations.

FIG. 8 illustrates select example components of the mobile device 102 that may implement the functionality described above according to some examples. The mobile device 102 may be any of a number of different types of computing devices, such as a smart phone, cellular phone, tablet computing device, or the like. In the example of FIG. 8, the mobile device 102 includes a plurality of components, such as at least one processor 802, one or more computer-readable media 804, the one or more communication interfaces 410, and one or more input/output (I/O) devices 806.

Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some cases, the processor 802 may be one or more hardware processors and/or logic circuits of any suitable type specifically programmed or configured to execute the algorithms and processes described herein. The processor 802 can be configured to fetch and execute computer-readable processor-executable instructions stored in the computer-readable media 804.

Depending on the configuration of the mobile device 102, the computer-readable media 804 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 804 may include, but is not limited to, RAM (random access memory), ROM (read only memory), EEPROM (electrically erasable programmable read only memory), flash memory, solid-state storage, magnetic disk storage, optical storage, and/or other computer-readable media technology. Thus, the computer-readable media 804 may include the memory portion 116 that is reserved for detecting flipped bits for sensing radioactive material proximate to the mobile device 102. In some cases, the memory portion 116 may be a significant percentage of the RAM, e.g., 25% of the available RAM on the mobile device 102. For instance, the radiation detecting module may cause an operating system 808 of the mobile device 102 to reserve the memory portion 116 to prevent writing of data to the memory portion 116. Therefore, the memory portion 116 can have a memory pattern e.g., all 0's, all 1's, alternating 1's and 0's, etc., that can be quickly scanned to detect any flipped bits.

Further, in some cases, the mobile device 102 may access external storage, such as RAID storage systems, storage arrays, network attached storage, storage area networks, cloud storage, or any other medium that can be used to store information and that can be accessed by the processor 802 directly or through another computing device or network. Accordingly, the computer-readable media 804 may be computer storage media able to store instructions, modules, or components that may be executed by the processor 802. Further, when mentioned, non-transitory computer-readable media exclude media such as energy, carrier signals, electromagnetic waves, and signals per se.

The computer-readable media 804 may be used to store and maintain any number of functional components that are executable by the processor 802. In some implementations, these functional components comprise instructions or programs that are executable by the processor 802 and that, when executed, implement operational logic for performing the actions attributed above to the mobile device 102. Functional components of the mobile device 102 stored in the computer-readable media 804 may include the repurposing modules 122, including the fire detecting module 124, the radiation detecting module 126, the Wi-Fi repeater module 128, and the live video module 130, as discussed above. In addition, the computer-readable media 804 may include the Wi-Fi driver 120, which may be configured to cause the Wi-Fi chip 118 of the mobile device 102 to function as a repeater. Additional functional components may include the operating system 808 for controlling and managing various functions of the mobile device 102 and for enabling basic user interactions with the mobile device 102.

In addition, the computer-readable media 804 may also store data, data structures and the like, that are used by the functional components. Depending on the type of the mobile device 102, the computer-readable media 804 may also store other functional components and data, such as other modules and data 810, which may include applications, programs, drivers, etc., and other data used or generated by the functional components. Further, the mobile device 102 may include many other logical, programmatic and physical components, of which those described are merely examples that are related to the discussion herein.

The communication interface(s) 410 may include one or more interfaces and hardware components for enabling communication with various other devices, such as over the network(s) 106 or directly. For example, communication interface(s) 410 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein. Thus, the communication interfaces 410 may include the Wi-Fi chip 118 discussed above, as well as other types of communication interfaces.

FIG. 8 further illustrates that the mobile device 102 may include a display 812. Depending on the type of the mobile device 102, the display 812 may employ any suitable display technology. In some examples, the display 812 may have a touch sensor (not shown) associated with the display 812 to provide a touchscreen display configured to receive touch inputs for enabling interaction with a GUI presented on the display 812, such as for directly interacting with the repurposing modules 122. Accordingly, implementations herein are not limited to any particular display technology. Alternatively, in some examples, the mobile device 102 may not include a display.

The mobile device 102 may further include the camera 402, including the image sensor 114, as well as the microphone 110, the temperature sensor 112, and other sensors 814 such as an accelerometer, gyroscope, compass, proximity sensor, and the like. In some examples, the temperature sensor 112 may be integral with the processor 802 and/or a board on which the processor 802 is mounted.

The mobile device 102 may further include one or more other I/O devices 806. The I/O devices 806 may include speakers and various user controls (e.g., buttons, a joystick, a keyboard, a keypad, etc.), a haptic output device, and so forth. Additionally, the mobile device 102 may include various other components that are not shown, examples of which may include removable storage, a power source, such as a battery and power control unit, and so forth.

Figure 9:
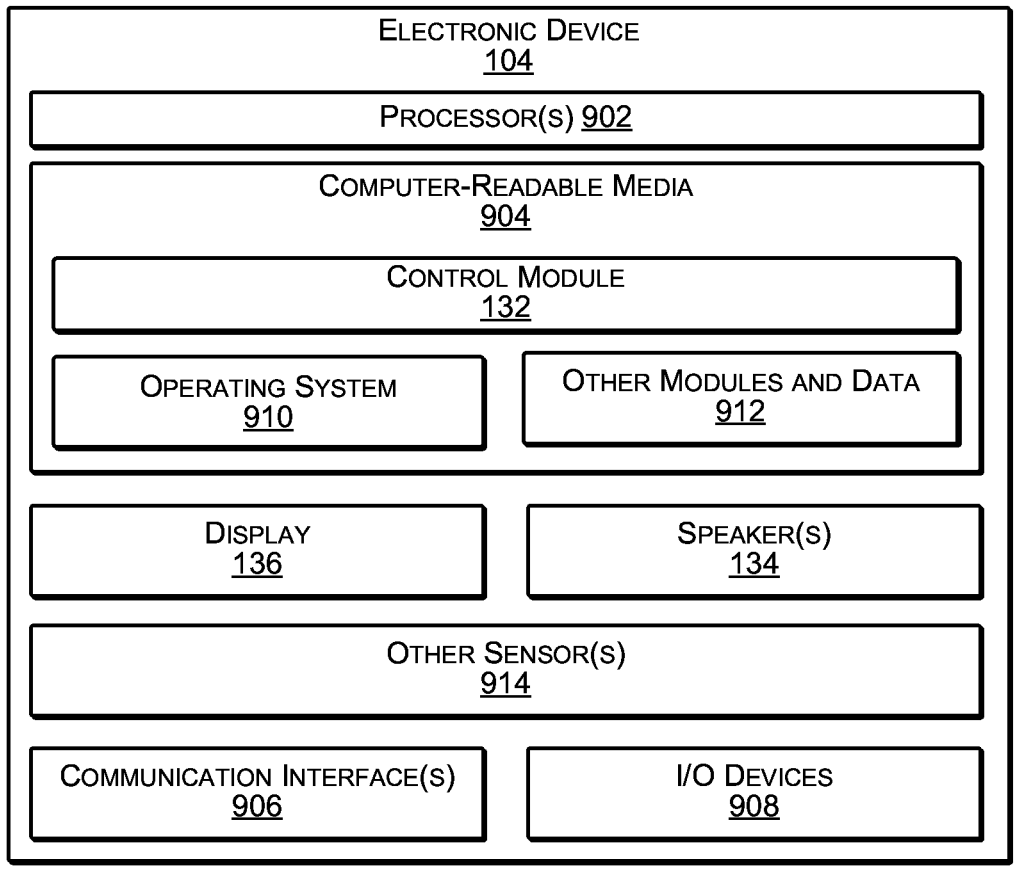
FIG. 9 illustrates select components of an example electronic device according to some implementations.

FIG. 9 illustrates select example components of the electronic device 104 that may implement the functionality described above according to some examples. The electronic device 104 may be any of a number of different types of computing devices, such as mobile, semi-mobile, semi-stationary, or stationary. Some examples of the electronic device 104 may include tablet computing devices, smart phones, wearable computing devices or body-mounted computing devices, and other types of mobile devices; laptops, netbooks and other portable computers or semi-portable computers; desktop computing devices, terminal computing devices and other semi-stationary or stationary computing devices; augmented reality devices and gaming systems; or any of various other computing devices capable of storing data, sending communications, and performing the functions according to the techniques described herein.

In the example of FIG. 9, the electronic device 104 includes a plurality of components, such as at least one processor 902, one or more computer-readable media 904, one or more communication interfaces 906, and one or more input/output (I/O) devices 908. Each processor 902 may itself comprise one or more processors or processing cores. For example, the processor 902 can be implemented as one or more microprocessors, microcomputers, microcontrollers, digital signal processors, central processing units, state machines, logic circuitries, and/or any devices that manipulate signals based on operational instructions. In some cases, the processor 902 may be one or more hardware processors and/or logic circuits of any suitable type specifically programmed or otherwise configured to execute the algorithms and processes described herein. The processor 902 can be configured to fetch and execute computer-readable processor-executable instructions stored in the computer-readable media 904.

Depending on the configuration of the electronic device 104, the computer-readable media 904 may be an example of tangible non-transitory computer storage media and may include volatile and nonvolatile memory and/or removable and non-removable media implemented in any type of technology for storage of information such as computer-readable instructions, data structures, program modules, or other data. The computer-readable media 904 may include, but is not limited to, RAM, ROM, EEPROM, flash memory, solid-state storage, magnetic disk storage, optical storage, and/or other computer-readable media technology. Further, in some cases, the electronic device 104 may access external storage, such as RAID storage systems, storage arrays, network attached storage, storage area networks, cloud storage, or any other medium that can be used to store information and that can be accessed by the processor 902 directly or through another computing device or network. Accordingly, the computer-readable media 904 may be computer storage media able to store instructions, modules, or components that may be executed by the processor 902. Further, when mentioned, non-transitory computer-readable media exclude media such as energy, carrier signals, electromagnetic waves, and signals per se.

The computer-readable media 904 may be used to store and maintain any number of functional components that are executable by the processor 902. In some implementations, these functional components comprise instructions or programs that are executable by the processor 902 and that, when executed, implement algorithms or other operational logic for performing the actions attributed above to the electronic device 104. Functional components of the electronic device 104 stored in the computer-readable media 904 may include the control module 132, as discussed above. Additional functional components may include an operating system 910 for controlling and managing various functions of the electronic device 104 and for enabling basic user interactions with the electronic device 104. In some examples, the control module 110 may not be used, and instead, the electronic device 104 may communicate with the mobile device 102 via one or more other modules, such as an email application, a browser, a module of the operating system 910, or the like, The computer-readable media 904 may also store data, data structures and the like, that are used by the functional components. Depending on the type of the electronic device 104, the computer-readable media 904 may also store other functional components and data, such as other modules and data 912, which may include applications, programs, drivers, etc., and other data used or generated by the functional components. Further, the electronic device 104 may include many other logical, programmatic and physical components, of which those described are merely examples that are related to the discussion herein.

The communication interface(s) 906 may include one or more interfaces and hardware components for enabling communication with various other devices, such as over the network(s) 106 or directly. For example, communication interface(s) 906 may enable communication through one or more of the Internet, cable networks, cellular networks, wireless networks (e.g., Wi-Fi) and wired networks, as well as close-range communications such as BLUETOOTH®, and the like, as additionally enumerated elsewhere herein.

FIG. 9 further illustrates that the electronic device 104 may include the display 136. Depending on the type of computing device used as the electronic device 104, the display 136 may employ any suitable display technology. For example, the display 136 may be a liquid crystal display, a plasma display, a light emitting diode display, an OLED (organic light-emitting diode) display, an electronic paper display, or any other suitable type of display able to present digital content thereon. In some examples, the display 136 may have a touch sensor (not shown) associated with the display 136 to provide a touchscreen display configured to receive touch inputs for enabling interaction with a GUI presented on the display 136. Accordingly, implementations herein are not limited to any particular display technology. Alternatively, in some examples, the electronic device 104 may not include a display.

The electronic device 104 may further include the one or more speakers 134 and other sensors 914 such as an accelerometer, gyroscope, compass, proximity sensor, and the like. The electronic device 104 may further include the one or more I/O devices 908. The I/O devices 908 may include a microphone, a camera, and various user controls (e.g., buttons, a joystick, a keyboard, a keypad, etc.), a haptic output device, and so forth. Additionally, the electronic device 104 may include various other components that are not shown, examples of which may include removable storage, a power source, such as a battery and power control unit, and so forth.

Various instructions, methods, and techniques described herein may be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A mobile device comprising:
one or more processors; and
one or more computer-readable media storing instructions executable by the one or more processors, wherein the instructions program the one or more processors to:
receive data comprising at least one of:
image data from an image sensor;
temperature data from a temperature sensor; or
sound data from a microphone;
determine, based at least in part on the received data that a fire is proximate to the mobile device by:
performing at least one recognition operation on the sound data received from the microphone to recognize a sound indicative of the fire comprising at least one of a smoke alarm sound indicative of the fire, or a crackling or popping sound indicative of the fire; and
based at least in part on recognizing the sound indicative of the fire, determining that the fire is proximate to the mobile device; and
send, to an electronic device, a notification of the fire.

2. The mobile device as recited in claim 1, wherein the instructions further program the one or more processors to:
scan a portion of memory of the mobile device to determine that a number of bits stored in the memory have changed since a last scan of the portion of memory;
compare the number of changed bits with a threshold; and
based at least in part on the number of changed bits exceeding the threshold, sending a notification to the electronic device indicating detection of radioactive material proximate to the mobile device.

3. The mobile device as recited in claim 1, wherein the instructions further program the one or more processors to:
scan the image sensor to determine that a number of pixels of the image sensor have become damaged or inoperable since a last scan of the image sensor;
compare the number of damaged or inoperable pixels with a threshold; and
based at least in part on the number of damaged or inoperable pixels exceeding the threshold, sending a notification to the electronic device to indicate detection of radioactive material proximate to the mobile device.

4. The mobile device as recited in claim 1, wherein the instructions further program the one or more processors to:
receive, from the electronic device, a request for image information; and
send, to the electronic device, at least one image received from the image sensor.

5. The mobile device as recited in claim 1, wherein the instructions further program the one or more processors to:
receive a signal from a wireless router; and
send a repetition of the signal to the electronic device.

6. The mobile device as recited in claim 1, wherein the determining that the fire is proximate to the mobile device comprises:
performing at least one recognition process on the image data to recognize a flame from the image data; and
based at least in part on recognizing the flame, determining that the fire is proximate to the mobile device.

7. The mobile device as recited in claim 1, wherein the determining that the fire is proximate to the mobile device comprises:
comparing a temperature indicated by the temperature data with a threshold temperature previously determined for the mobile device; and
based at least in part on the temperature exceeding the threshold temperature, determining that the fire is proximate to the mobile device.

8. A method comprising:
scanning, by one or more processors of a mobile device, at least one of a portion of memory of the mobile device or an image sensor of the mobile device to determine a change since a last scan of the portion of memory or the image sensor, respectively;
based at least in part on determining that a number pixels of the image sensor that have become damaged or inoperable since a prior scan exceeds a threshold, sending a notification to the electronic device indicating detection of radioactive material proximate to the mobile device; and
concurrently monitoring, by the one or more processors, an area proximate to the mobile device for fire.

9. The method as recited in claim 8, further comprising, concurrently with the scanning and the monitoring, repeating at least one of:
   a signal received from a wireless router; or
   a signal received from an electronic device.

10. The method as recited in claim 8, wherein the concurrently monitoring the area proximate to the mobile device for fire comprises:
    receiving, from the image sensor, at least one image;
    performing a recognition analysis on the image to determine that a fire is proximate to the mobile device; and
    sending another notification based on determining that the fire is proximate to the mobile device.

11. The method as recited in claim 8, wherein the concurrently monitoring the area proximate to the mobile device for fire comprises:
    receiving, from a temperature sensor, an indication of a temperature;
    comparing the temperature with a threshold to determine that a fire is proximate to the mobile device; and
    sending another notification based on determining that the fire is proximate to the mobile device.

12. The method as recited in claim 8, wherein the concurrently monitoring the area proximate to the mobile device for fire comprises:
    receiving sound data from a microphone of the mobile device;
    performing a recognition analysis on the sound data to recognize at least one of a smoke alarm sound indicative of a fire, or a crackling or popping sound indicative of the fire to determine that the fire is proximate to the mobile device; and
    sending another notification based on determining that the fire is proximate to the mobile device.

13. The method as recited in claim 8, further comprising:
    receiving, from the electronic device, a request for video and/or sound data from the mobile device; and
    sending, to the electronic device, a plurality of images from the image sensor and/or sound received from the microphone of the mobile device.

14. A system comprising:
    a mobile device able to communicate with at least one electronic device, the mobile device including at least one processor programmed by executable instructions to perform operations comprising:
    monitoring an area proximate to the mobile device for fire; and
    monitoring the area proximate to the mobile device for radioactive material by:
      scanning an image sensor of the mobile device to determine that a number of pixels of the image sensor have become damaged or inoperable since a last scan of the image sensor,
      comparing the number of damaged or inoperable pixels with a threshold, and
      based at least in part on the number of damaged or inoperable pixels exceeding the threshold, sending a notification indicating that radioactive material is proximate to the mobile device.

15. The system as recited in claim 14, wherein the monitoring the area proximate to the mobile device for radioactive material comprises:
    scanning a memory portion of the mobile device to determine that a number of bits stored in the memory portion have changed since a last scan of the memory portion;
    comparing the number of changed bits with a threshold; and
    based at least in part on the number of changed bits exceeding the threshold, sending a notification to the electronic device indicating that radioactive material is proximate to the mobile device.

16. The system as recited in claim 14, wherein the monitoring the area proximate to the mobile device for fire comprises:
    receiving image data from an image sensor of the mobile device and sound data from a microphone of the mobile device;
    performing a first recognition process on the image data to recognize a flame;
    performing a second recognition process on the sound data to recognize a sound indicative of a fire comprising at least one of a smoke alarm sound indicative of the fire, or a crackling or popping sound indicative of the fire; and
    based at least in part on recognizing at least one of the flame or the sound indicative of the fire, determining that the fire is proximate to the mobile device.

17. The system as recited in claim 14, wherein the monitoring the area proximate to the mobile device for fire comprises:
    receiving temperature data from a temperature sensor that also measures a temperature of the at least one processor;
    comparing a temperature indicated by the temperature data with a threshold temperature previously determined for the mobile device; and
    based at least in part on the temperature exceeding the threshold temperature, determining that the fire is proximate to the mobile device.

18. The system as recited in claim 14, wherein the at least one processor is further programmed by executable instructions to perform operations comprising:
    sending, to the electronic device, a notification based on detecting at least one of the fire or the radioactive material;
    receiving, from the electronic device in response to the notification, a request for at least one of video or audio; and
    sending, to the electronic device, at least one of video images received from an image sensor of the mobile device or audio received from a microphone of the mobile device.

* * * * *